US 6,665,067 B2

(12) United States Patent
Ogawa et al.

(10) Patent No.: US 6,665,067 B2
(45) Date of Patent: Dec. 16, 2003

(54) LASER BEAM DETECTING DEVICE FOR A CONSTRUCTION MACHINE

(75) Inventors: Yohei Ogawa, Tokyo (JP); Jun Sasagawa, Tokyo (JP); Hirokazu Yamada, Tokyo (JP); Hiroto Shibuya, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 0 days.

(21) Appl. No.: 10/194,238

(22) Filed: Jul. 15, 2002

(65) Prior Publication Data
US 2002/0170210 A1 Nov. 21, 2002

Related U.S. Application Data

(63) Continuation of application No. 09/594,614, filed on Jun. 15, 2000, now abandoned.

(30) Foreign Application Priority Data

Jun. 15, 1999 (JP) .......................................... 11-168148

(51) Int. Cl.$^7$ ................................................ G01C 9/02
(52) U.S. Cl. ................................................ 356/247
(58) Field of Search ........................ 250/208.2; 356/247

(56) References Cited

U.S. PATENT DOCUMENTS

| 4,726,682 A | 2/1988 | Harms et al. ............... 356/622 |
| 4,807,131 A | 2/1989 | Clegg ......................... 701/50 |
| 4,820,041 A | 4/1989 | Davidson et al. ........... 356/3.12 |
| 4,884,939 A | 12/1989 | Nielsen ....................... 414/698 |
| 4,888,890 A | 12/1989 | Studebaker et al. .......... 37/348 |
| 4,945,221 A | 7/1990 | Nielsen et al. ........... 250/203.1 |
| 5,471,049 A | 11/1995 | Cain ........................ 250/208.2 |
| 5,917,593 A | 6/1999 | Hirano et al. ............... 356/247 |
| 5,983,511 A | 11/1999 | Osaragi et al. ............... 33/293 |
| 6,166,802 A | 12/2000 | Kodaira et al. ............. 356/4.08 |
| 6,266,623 B1 | 7/2001 | Vock et al. .................... 702/44 |

FOREIGN PATENT DOCUMENTS

| EP | 0 262 764 | 4/1988 | ............. E02F/5/14 |
| EP | 797075 A2 * | 9/1997 | ........... G01C/15/00 |

* cited by examiner

Primary Examiner—Thomas G. Black
Assistant Examiner—Deandra M. Hughes
(74) Attorney, Agent, or Firm—Foley & Lardner

(57) ABSTRACT

In a laser beam detecting device for a construction machine, a beam sensor is installed above a leveling implement of the construction machine, a laser beam is detected by the beam sensor, and information based on the beam detection is displayed on a display. A plurality of reference positions are established in a range in which the beam sensor detects the laser beam. One of the reference positions is made a standard position, while the other reference positions are made offset positions.

13 Claims, 6 Drawing Sheets

LASER BEAM DETECTING DEVICE FOR A CONSTRUCTION MACHINE

This application is a continuation of application Ser. No. 09/594,614, filed on Jun. 15, 2000, now abandoned, which claims the benefit of Japanese Application No. 11-168148, filed on Jun. 15, 1999.

TECHNICAL FIELD OF THE INVENTION

The present invention relates to a laser beam detecting device for a construction machine wherein a beam sensor is mounted above a leveling implement, a laser beam for forming a reference plane is detected by the beam sensor, and information based on the detection of the laser beam is displayed on a display.

RELATED ART

In a civil engineering work such as a land formation work for leveling land there is used a construction machine equipped with a leveling implement, such as a shovel car, a bulldozer, or a crawler.

Formerly, an operator of a construction machine executed a land formation work with his eye while making a survey repeatedly to check the degree of flatness.

Recently, however, with use of a rotating laser, it has become possible for an operator of a construction machine to check the degree of flatness directly on an operator seat. In this case, a laser beam as a reference is detected by a beam sensor mounted above a leveling implement and an offset direction from the reference laser beam is displayed on a display.

The beam sensor is mounted at a relatively high position above the leveling implement to prevent the laser beam from being intercepted by an arm or any other component installed in the body of the construction machine.

As to a laser beam detecting range in the beam sensor, only one reference position has heretofore been set centrally of the sensor.

Since the detection range for the incidence of laser beam in the beam sensor is thus limited, if a laser beam incidence position is outside the detection range, there will be made no display as to in which direction the laser beam should travel.

Particularly, in a banking or trenching work, the leveling implement shifts largely in the vertical direction, so there occurs a case where the detection range of the beam sensor becomes deficient.

For example, in a trenching work with use of an excavator (a shovel car), a bucket is moved over a relatively wide range in the earth surface direction (vertical direction) from a to-be-trenched depth, so that a wider detection range is desired.

On the other hand, if there is adopted a structure having a wider detectable range of the beam sensor, a beam receiving portion in the laser beam detecting device concerned becomes larger (i.e., longer in the vertical direction) physically, resulting in that when the detecting device is to be attached, for example, to an arm of a construction machine, it is difficult to do so. Additionally, there arises a danger that the detecting device may interfere with any other portion (e.g. the leveling implement or earth).

SUMMARY OF THE INVENTION

It is an object of the present invention to provide a laser beam detecting device for a construction machine capable of detecting a laser beam in a wider detection range without enlarging a beam receiving portion.

The object of the present invention is achieved by a laser beam detecting device for a construction machine described herein.

In a laser beam detecting device for a construction machine according to a preferred mode of the present invention, a beam sensor is mounted above a leveling implement, a laser beam as a reference is detected by the beam sensor, and information based on the beam detection is displayed on a display.

A plurality of reference positions are established in a detection range of a beam receiving portion of the beam sensor and one of the reference positions is made a standard position, while the other reference positions are made offset positions. First and second offset positions are established respectively above and below the standard position. There is provided a display (display portion) indicating in which of standard and offset positions the laser beam detection is being conducted.

In the beam sensor used in the laser beam detecting device according to the present invention, the reference positions (height indications) are capable of being offset, whereby height information in a predetermined direction can be detected and displayed in a wider range. Preferably, a laser beam is detected, and on the basis of the detected beam incidence position, the direction in which the leveling implement is to be moved, as well as the distance at which the leveling implement is to be moved, are indicated to the operator.

The laser beam detecting device is fixed to a predetermined position of, for example, an arm of a construction machine such as an excavator through a magnet or a clamp. The predetermined position as referred to herein indicates a position which permits an offset to be clarified between a tip end of a leveling implement such as a bucket which forms a working surface and the predetermined position.

For example, in the case where there are three reference positions, it is preferable that a central reference position be made a standard position, that offset positions be established one each above and below the standard position, and that position information, which urges movement, be indicated to the operator in the same quantity in the vertical direction. Since not only the central reference position (on-grade position) alone in the laser beam detection range of the laser beam detecting device, but also upper and lower offset positions with respect to the central reference position can be established, it is possible to substantially expand the detection range in the predetermined direction.

The detection range in the predetermined direction can be widened according to contents of a work to be executed without changing the size of the laser beam receiving portion in the beam sensor, and therefore the work can be carried out in a more accurate manner.

Thus, according to the present invention, reference positions can be offset with respect to the predetermined direction without any change in the detection range.

For example, although the detection range on one side becomes narrow, this poses no problem in view of the contents of a work which involves establishing offset positions. For example, in case of a trenching work, it is only when trenching proceeds to excess downward beyond a to-be-trenched depth that the detection range shifts, and therefore even if the detection range lower than the to-be-trenched depth is narrow, it will do.

The laser beam detecting device is attached, at the back of its body, to a predetermined position (e.g., arm) of a construction machine removably with screws or the like.

Alternatively, the laser beam detecting device may be fixed magnetically to a leveling implement of a construction machine. In this case, a strong magnetic force can be obtained by holding plural magnets in between plural net plates. In this case there is attained a high durability because the steel plates are in contact with the leveling implement. Besides, since the steel plates are each adapted to move slightly, they can fix the magnets securely and prevent them from coming off even if the magnet surfaces are somewhat uneven or even under an abrupt shock.

The laser beam detecting device may also be fixed to a pole or the like which is fixed to the leveling implement. In this case, a clamp is often used for the fixing.

EMBODIMENT

An embodiment of the present invention will be described hereunder with reference to the accompanying drawings.

Figure 1:
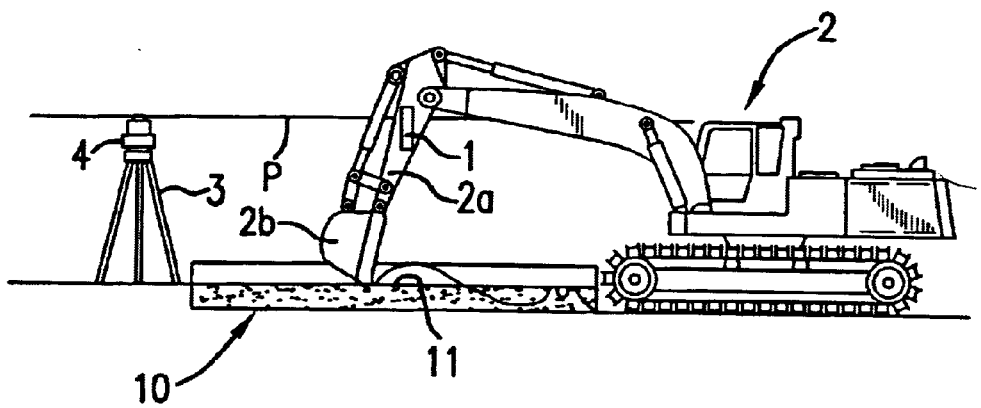
FIG. 1 is an explanatory diagram showing a state in which a shovel car having a laser beam detecting device for a construction machine according to the present invention is performing a standard work.
Figure 2:
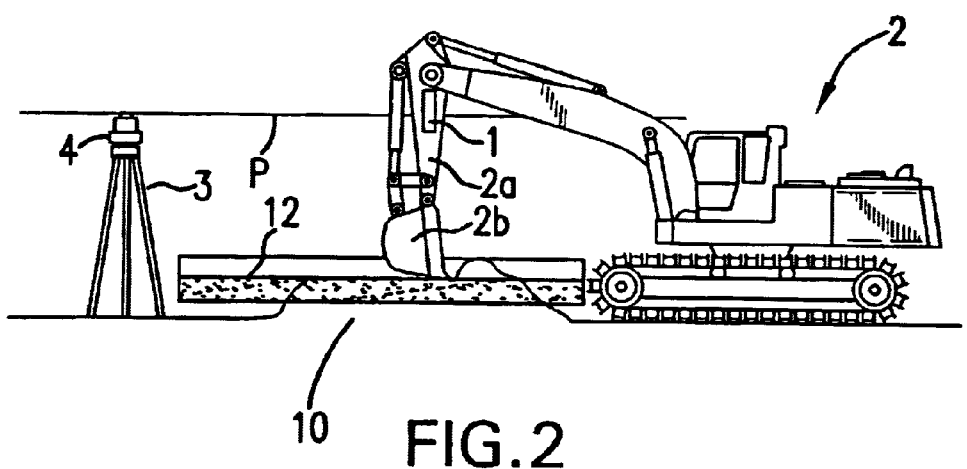
FIG. 2 is an explanatory diagram showing a state in which the shovel car is performing a banking work.
Figure 3:
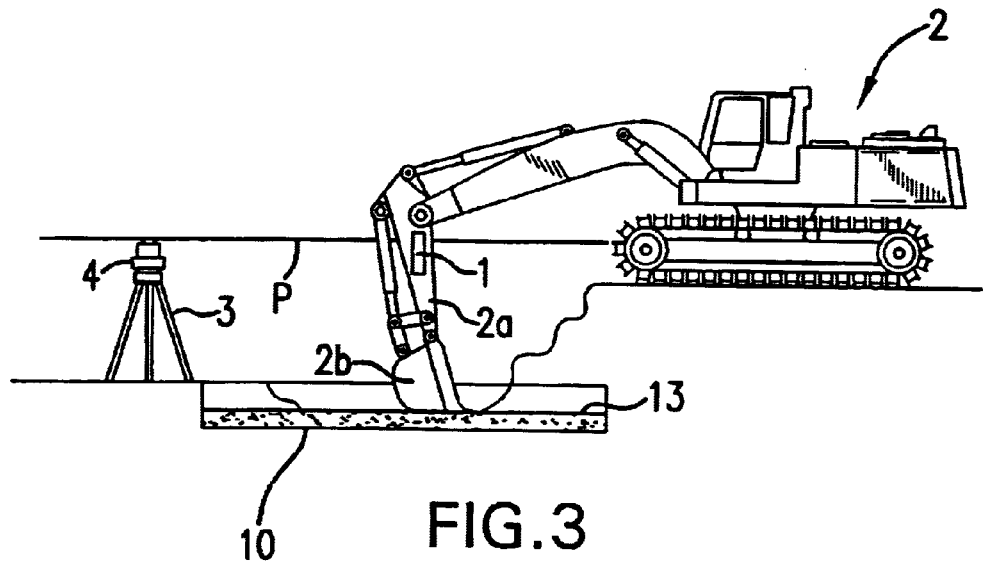
FIG. 3 is an explanatory diagram showing a state in which the shovel car is performing a trenching work.

FIGS. 1 to 3 are plan views each showing a state in which a civil engineering work is being carried out by a shovel car 2 equipped with a laser beam detecting device 1 for a construction machine according to the present invention.

FIG. 1 shows an example of an ordinary work, FIG. 2 shows an example of a banking work, and FIG. 3 shows an example of a trenching work.

In FIGS. 1 to 3, the reference numeral 10 denotes a detection range of a leveled land (formed land surface).

In the leveled state shown in FIG. 1, a reference position 11 of the leveled land is a standard position.

In the leveled state shown in FIG. 2, a reference position 12 of the leveled land is a first offset position offset upward from the standard position shown in FIG. 1.

In the leveled state shown in FIG. 3, a reference position 13 of the leveled land is a second offset position offset downward from the reference position 11 shown in FIG. 1.

In all of the illustrated works, a rotating laser 4 is installed at a predetermined position of the leveled land or a land adjacent thereto through a tripod 3. A laser beam P emitted from the rotating laser 4 forms a reference plane.

The laser beam detecting device 1, which is for indicating an appropriate height to an operator on the construction machine 2 in cooperation with the laser beam P, is attached to an arm portion 2a of the construction machine 2.

Figure 4:
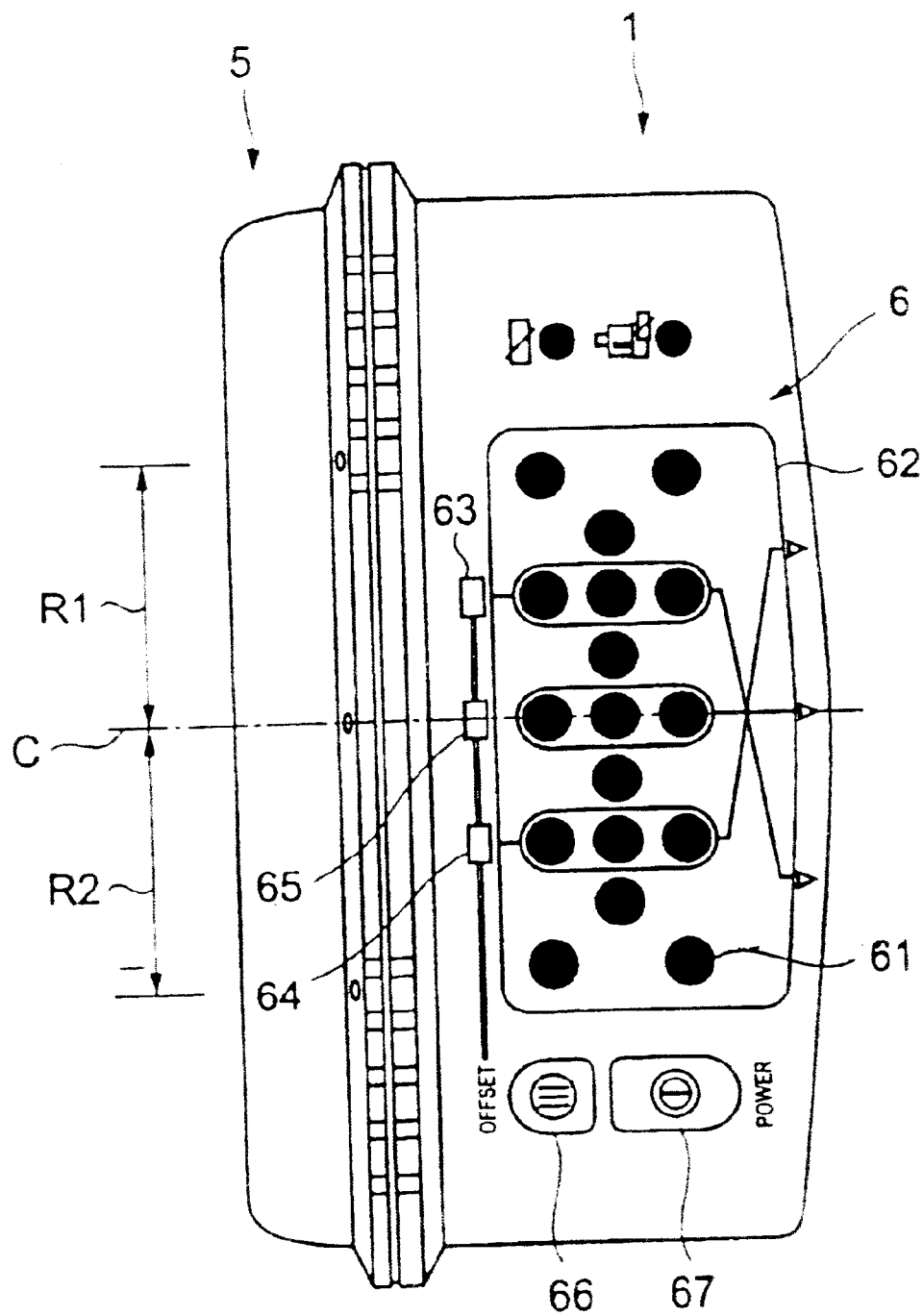
FIG. 4 is a side view of the laser beam detecting device.

As shown in FIG. 4, the laser beam detecting device 1 has a beam sensor 5 for detecting the laser beam P and a display 6 for indicating an offset from the appropriate height to the operator on the construction machine 2 on the basis of the result of the detection.

The beam sensor 5 is disposed at a front position of the laser beam detecting device 1. In a detection range of the beam sensor 5 are disposed an upper range R1 and a lower range R2 with respect to a center C. The ranges R1 and R2 are each about 10 cm in size. A laser beam is transmitted from left to right in FIG. 4 and can enter the detection range of the beam sensor 5.

Within a rectangular frame 62 on the display 6 are arranged a large number of light emitting elements (e.g., LEDs) 61 in accordance with a predetermined pattern. Nine rows are set in the vertical direction. Successively from above, two, one, three, one, three, one, three, one, and two light emitting elements 61 are arranged in the nine rows, respectively. Thus, there are three rows each including three light emitting elements, all of which represent reference positions and of which the central row represents a standard position, while the upper and lower rows represent first and second offset positions, respectively. Marks 63, 64, and 65, which are light emitting elements, are arranged correspondingly to the rows indicative of those reference positions.

The reference numeral 66 denotes a button for selecting any one of the mark 65 as the standard position and the marks 63 and 64 as the first and second offset positions. The positions of the marks 63, 64, and 65, which are set (i.e., go ON) at every depression of the button 66 by the operator, change rotationwise. The numeral 67 denotes a power switch for ON-OFF switching.

The operation of the display 6 will now be described with reference to FIGS. 5 to 7. In these figures, white circles and squares indicate an ON (or ON-OFF) state of the light emitting elements 61 and 63 to 65, while black circles and squares indicate an OFF state of the light emitting elements 61 and 63 to 65.

Figure 5:
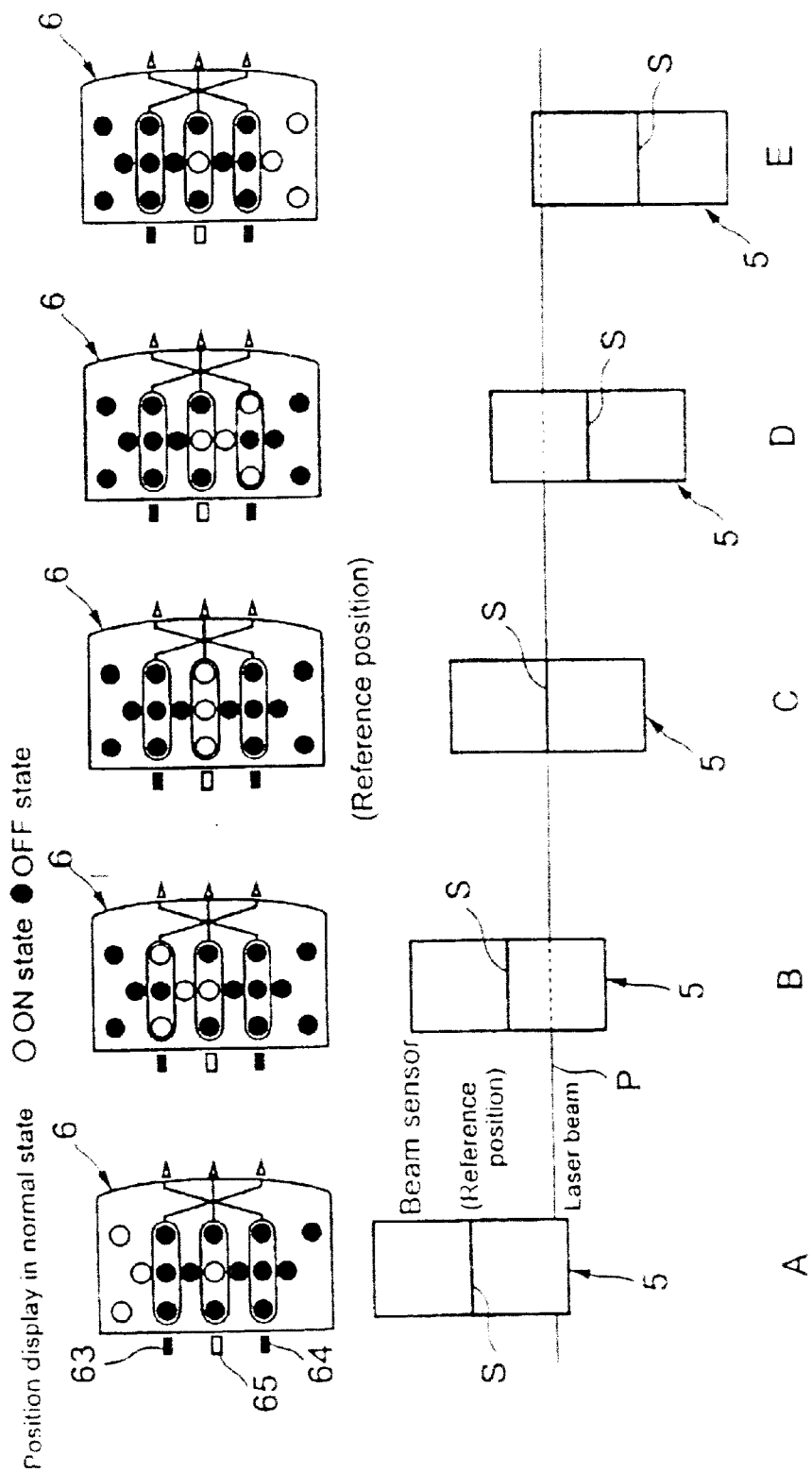
FIG. 5 is a diagram showing an example of position display in a normal state with respect to a beam sensor and a display.

FIG. 5 shows an example of position display in a normal state, in which the mark 65 at the standard position is ON.

In A and B of FIG. 5, the laser beam P lies below the reference position (standard position) S of the beam sensor 5.

In C of FIG. 5, the laser beam P is in coincidence with the reference position (standard position) S.

In D and E of FIG. 5, the laser beam P lies above the reference position (standard position) S.

Figure 6:
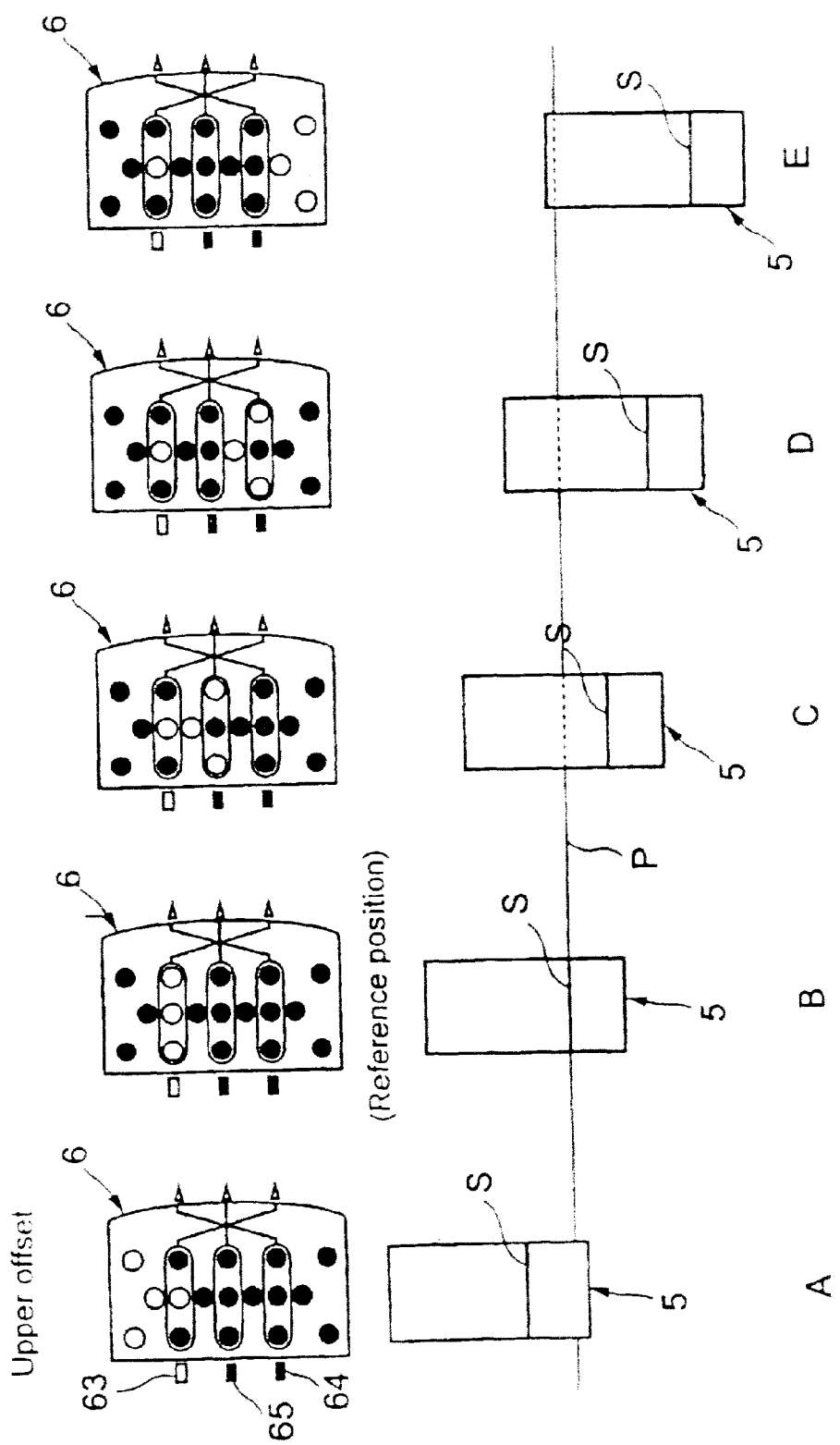
FIG. 6 is an explanatory diagram showing an example of position display in an upper offset state with respect to the beam sensor and the display.

FIG. 6 shows an upwardly offset state, in which the mark 63 located at the first offset position is ON.

In A of FIG. 6, the laser beam P lies below the reference position S.

In B of FIG. 6, the laser beam P is in coincidence with the reference position S.

In C, D, and E of FIG. 6, the laser beam P lies above the reference position S.

Figure 7:
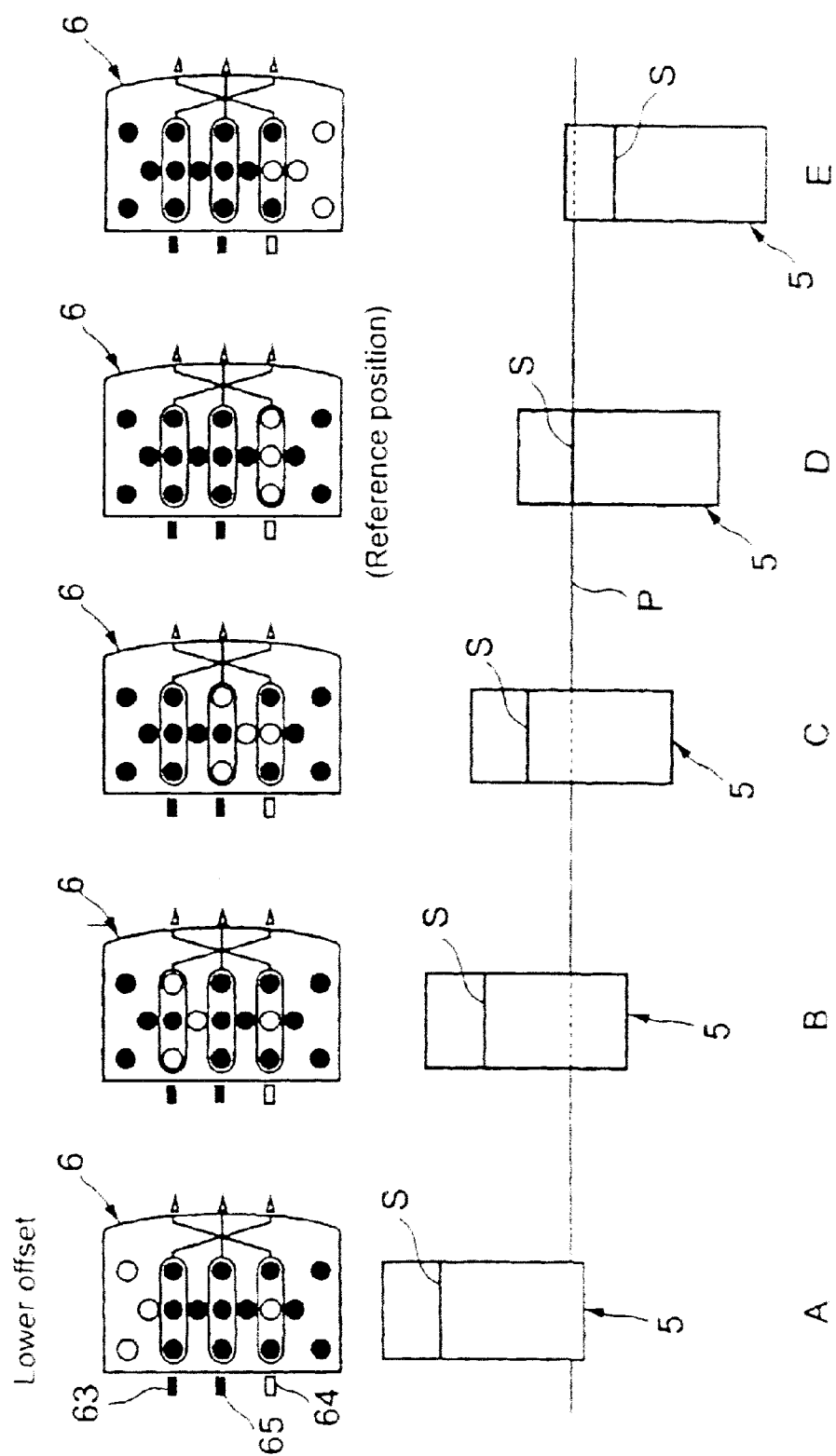
FIG. 7 is an explanatory diagram showing an example of position display in a lower offset state with respect to the beam sensor and the display.

FIG. 7 shows a downwardly offset state, in which the mark 66 located at the second offset position is ON.

In A, B, and C of FIG. 7, the laser beam P lies below the reference position S.

In D of FIG. 7, the laser beam P is in coincidence with the reference position S.

In E of FIG. 7, the laser beam P lies above the reference position S.

As noted earlier, when the reference position S is offset from the laser beam P, the four light emitting elements 61 emit light in two modes (three light emitting elements which constitute a triangular shape and one light emitting element present at the established reference position), urging the operator to move the bucket 2b At this time, the light emitting element present at the reference position serves as a reference indicating the width and direction of offset with respect to the three light emitting elements which constitute a triangular shape. When the offset is small, the movement of the bucket 2b is set small, while when the movement of the offset is large, the movement of the bucket 2b is set large.

A plurality of light emitting elements located at the reference position may be turned ON so as to represent a reference line.

When the reference position S and the position of the laser beam P coincide with each other, the light emitting elements 61 which have emitted light in a triangular shape go OFF and a transverse row of three light emitting elements 61 newly located at the reference position emit light, indicating completion of the movement.

Preferably, the light emitting elements 61 in a triangular form and the light emitting elements 61 located in the apex direction of the triangle are turned ON in an alternate manner, thereby making it easier to visually check the direction and width of offset.

Figure 8:
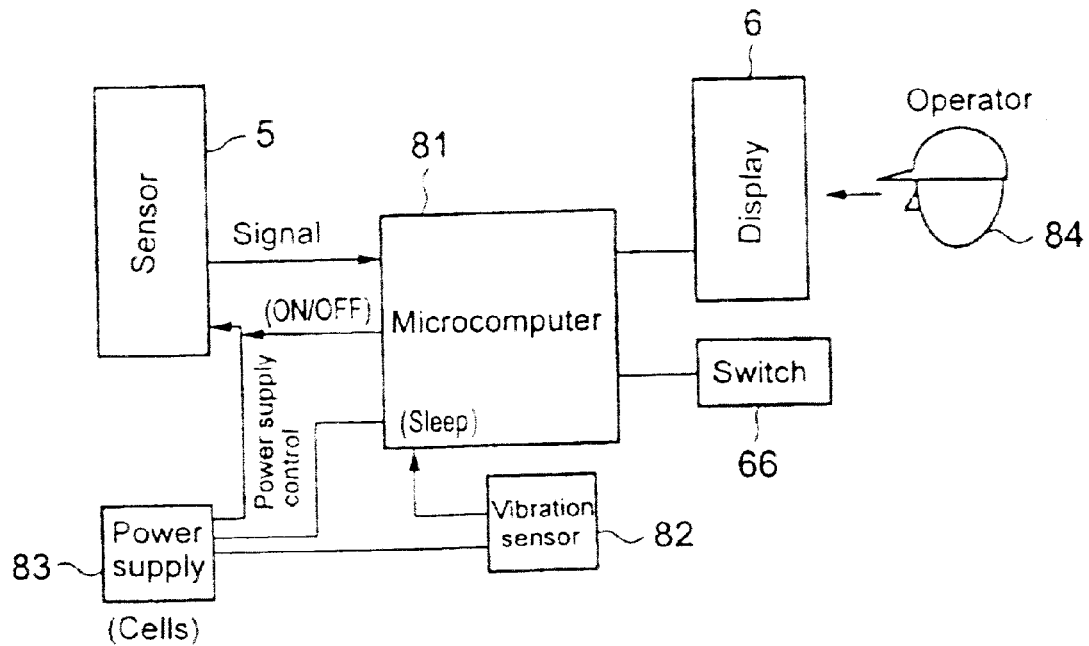
FIG. 8 is a block diagram showing a controller for the beam sensor.

FIG. 8 shows a system for controlling the beam sensor 5 and the display 6.

The beam sensor 5 for detecting the laser beam P has an analog circuit (not shown). A power supply 83 for the beam sensor is controlled by a microcomputer 81 which is incorporated in the body of the laser beam detecting device.

If there is no input of the laser beam P for a certain period of time (e.g., 5 minutes), the microcomputer 81 judges that no construction work is being conducted, then sets the operation mode to a sleep mode and turns OFF the power supply 83 for the beam sensor 5.

On the other hand, upon turning to the sleep state, a sleep reset signal, which is inputted to the microcomputer 81 from a vibration sensor 82, becomes effective. This signal is for canceling the sleep state and is applied to the microcomputer 81 when vibration is detected by the vibration sensor 82.

The vibration sensor 82 is power-supplied by the power supply 83, which is kept ON.

An example of power consumption will now be described. The power consumption of the entire device is 300 mW in operation and is 49 mW in the sleep state. The analog circuit in the beam sensor 5 consumes electric power about five-sixths of the electric power consumed by the entire detecting device and thus the power saving effect in the sleep mode is high.

The reason for such a large power consumption of the beam sensor 5 is that the beam sensor requires a large number of circuit channels for detecting a laser beam incidence position and that therefore a large electric power is consumed inevitably.

As the power supply 83 there are used four UM-3 charging cells of NiMH type. Of course, the ordinary type of dry cells or battery may also be used.

Figure 9:
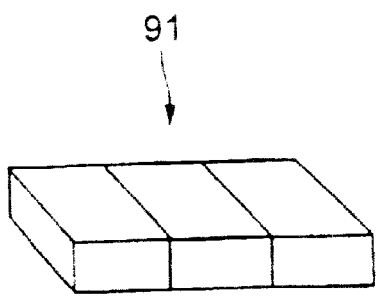
FIG. 9 is a perspective view showing an example of a vibration sensor.

FIG. 9 shows an example of the vibration sensor 82.

The vibration sensor 82 is of a configuration similar to the configuration of a chip capacitor and possesses a characteristic such that a weak current is generated upon imposition of vibration on plural capacitors 91.

Since an electric current generated actually is fairly weak, it is amplified by means of an amplifier (not shown) and thereafter a sleep reset signal is sent to a sleep reset port of the microcomputer 81.

The power consumption of the vibration sensor 82 is fairly weak and is 1 mW or so, even including the amplifier circuit.

The vibration sensor 82 used in this embodiment is "PKGS-45LB-TC" (a product of Murata Manufacturing Company Limited).

In FIG. 8, the numeral 84 denotes an operator and numeral 66 denotes a switch for the microcomputer 81.

The use of such a vibration sensor 82 permits reduction of the power consumption in the entire laser beam detecting device. Particularly, where a battery or the like is used as a drive source, there no longer is any fear that the work may be interrupted by exhaustion of the battery, thus enhancing the working efficiency. Besides, by keeping the power consumption low, it is possible to reduce the battery capacity and lighten the device weight. That the device becomes light is advantageous in that the device becomes less likely to come off under a sudden shock and becomes easier to carry for installation in a construction machine.

The use of the vibration sensor permits the device to be controlled accurately in conformity with the operating condition of the construction machine in which it is installed.

In the laser beam detecting device for a construction machine according to the present invention, the detection range can be widened greatly, so that even a banking or trenching work can be carried out efficiently. Particularly, a leveling work can be executed in an efficient manner.

Where the detection range in one direction is to be expanded, this can be attained by setting a reference position in the laser beam detection range at the first or the second offset position. For example, in case of a trenching work, if a reference position in the laser beam detection range is set at the upper, first offset position, the leveling implement (bucket) does not move deeper than the to-be-trenched depth except where excavation goes to excess. Therefore, even if the detection range lower than the to-be-trenched depth is narrow, it will do.

What is claimed is:

1. A laser beam detecting device for a construction machine having a leveling implement, comprising:

a beam sensor installable above the leveling implement of the construction machine to detect a laser beam as a reference, wherein the beam sensor has a wide detection range with a plurality of reference positions set at plural fixed positions to be selectively used as a standard position;

a display for displaying information based on the laser beam detected by the beam sensor; and a selector for selecting one of the reference positions at the plural fixed positions as a standard position, the display having a plurality of light emitting elements which are arranged at a plurality of predetermined fixed positions in accordance with a predetermined pattern so as to represent the reference positions in such a manner that the pattern is recognizable by an operator on the construction machine, wherein the display includes a plurality of light emitting elements for indicating width and direction of offset of a laser beam position relative to the reference position selected by the selector, and wherein the light emitting elements for indicating the width and direction of offset include two sets of three light emitting elements arranged in a triangular shape.

2. A laser beam detecting device for a construction machine according to claim 1, wherein the light emitting elements are set so as to form a plurality of rows which represent the reference positions, and wherein the display further includes a plurality of marks formed by the light emitting elements which are arranged corresponding to rows indicative of the reference positions.

3. A laser beam detecting device for a construction machine according to claim 1, wherein the reference positions include first, second and third reference positions, wherein the first reference position is represented by a first number of light emitting elements arranged so as to form a row at a central portion of a detection range, wherein the second reference position is represented by a second number of light emitting elements arranged so as to form a row between the central portion and an upper end of the detection range, and wherein the third reference position is represented by a third number of light emitting elements arranged so as to form a row between the central portion and a lower end of the detection range.

4. A laser beam detecting device for a construction machine according to claim 1, wherein the display selectively displays upward and downward directions with respect to a selected reference position where the laser beam is present.

5. A laser beam detecting device for a construction machine according to claim 1, wherein the selector is a button disposed on the display to allow a user to toggle between first, second, and third reference positions as the standard position.

6. A laser beam detecting device for a construction machine having a leveling implement, comprising:
   a beam sensor installable above the leveling implement of the construction machine to detect a laser beam as a reference, wherein the beam sensor has a wide detection range with a plurality of reference positions set at plural fixed positions to be selectively used as a standard position; and
   a display for displaying information based on the laser beam detected by the beam sensor; and
   a selector for selecting one of the reference positions at the plural fixed positions as a standard position,
   the display having a plurality of light emitting elements which are arranged at a plurality of predetermined fixed positions in accordance with a predetermined pattern so as to represent the reference positions in such a manner that the pattern is recognizable by an operator on the construction machine, wherein the reference positions include a central standard position and first and second offset positions which are established respectively above and below the central standard position, and wherein the display includes three rows of light emitting elements for indicating three reference positions, and four sets of light emitting elements for indicating width and direction of offset of a laser beam position relative to the reference position selected by the selector.

7. A laser beam detecting device for a construction machine according to claim 6, wherein the selector is a button disposed on the display to allow a user to toggle between reference positions as the standard position.

8. A laser beam detecting device for a construction machine according to claim 6, wherein the display selectively displays upward and downward directions with respect to a selected reference position where the laser beam is present.

9. A laser beam detecting device for a construction machine having a leveling implement, comprising;
   a beam sensor installable above the leveling implement of the construction machine to detect a laser beam as a reference, wherein the beam sensor has a wide detection range wit a plurality of reference positions set at plural fixed positions to be selectively used as a standard position;
   a display for displaying information based on the laser beam detected by the beam sensor; and
   a selector for selecting one of the reference positions at the plural fixed positions as a standard position,
   the display having a plurality of light emitting elements which are ranged at a plurality of predetermined fixed positions in accordance with a predetermined pattern so as to represent the reference positions in such a manner that the pattern is recognizable by an operator on the construction machine, wherein the reference positions include a central standard position and first and second offset positions which are established respectively above and below the central standard position, and wherein the display comprises:
      first, second, and third rows of two or more LEDs, wherein the first row is adapted to activate one or more LEDs corresponding to a first reference position, the second row is adapted to activate one or more LEDs corresponding to a second reference position, and the third row is adapted to activate one or more LEDs corresponding to a third reference position; and
      at least four sets of one or more LEDs, wherein each of the rows is placed between adjacent two of the four sets.

10. A laser beam detecting device for a construction machine according to claim 9, wherein each of two sets of the four sets include three light emitting elements arranged in a triangular shape.

11. A laser beam detecting device for a construction machine according to claim 9, wherein the display further comprises:
   nine rows of LEDs having the following number of LEDs, in order from top to bottom: two, one, three, one, three, one, three, one, and two, wherein one or more of the LEDs in a particular row are activated depending on a vertical position of the beam sensor.

12. A laser beam detecting device for a construction machine according to claim 9, wherein the display selectively displays upward and downward directions with respect to a selected reference position where the laser beam is present.

13. A laser beam detecting device for a construction machine according to claim 9, wherein a direction and width of offset between a selected reference position and the laser beam are displayed on the display.

* * * * *